United States Patent [19]

Aishima et al.

[11] 4,146,549
[45] Mar. 27, 1979

[54] HYDROCARBON-SOLUBLE ORGANOALUMINUM-MAGNESIUM COMPLEX

[75] Inventors: Itsuho Aishima, Fujisawashi; Hisaya Sakurai, Kurashikishi; Yukichi Takashi, Kurashikishi; Hideo Morita, Kurashikishi; Tadashi Ikegami, Kurashikishi; Toshio Sato, Kurashikishi, all of Japan

[73] Assignee: Asahi Kasei Kogyo Kabushiki Kaisha, Osaka, Japan

[21] Appl. No.: 768,503

[22] Filed: Feb. 14, 1977

Related U.S. Application Data

[62] Division of Ser. No. 579,639, May 21, 1977, Pat. No. 4,037,089.

[30] Foreign Application Priority Data

May 25, 1974 [JP] Japan ................................ 49-58378
Jun. 13, 1974 [JP] Japan ................................ 49-66515
Sep. 26, 1974 [JP] Japan ................................ 49-110004

[51] Int. Cl.$^2$ .................................................. C07F 5/06
[52] U.S. Cl. .......................... 260/448 A; 252/431 R; 252/429 B; 252/429 C; 260/448 R; 260/448 AD
[58] Field of Search ............. 260/448 A, 448 AD; 252/431 R, 429 B, 429 C; 260/448 R

[56] References Cited

U.S. PATENT DOCUMENTS

| | | | |
|---|---|---|---|
| 2,899,415 | 8/1959 | Truett | 260/94.9 |
| 3,737,393 | 6/1973 | de Vries | 252/431 R |
| 3,761,500 | 9/1973 | Thomas | 260/448 AD |
| 3,773,733 | 11/1973 | Matsushima | 260/448 AD |
| 3,920,713 | 11/1975 | Feichtinger et al. | 260/448 AD |
| 4,004,071 | 1/1977 | Aishima et al. | 252/429 C X |

OTHER PUBLICATIONS

Malpass, J. Organometallic Chem. 93, 1-8 (1975).
Chem. Abstracts 63, 18148b (1965).

*Primary Examiner*—Helen M. S. Sneed
*Attorney, Agent, or Firm*—Sprung, Felfe, Horn, Lynch & Kramer

[57] ABSTRACT

A novel process for polymerizng ethylene or a mixture of ethylene and another olefin is provided. In this process a novel catalyst having a very high activity per solid component of catalyst is used. Said catalyst is prepared by reacting a specific hydrocarbon-soluble organoaluminum-magnesium complex containing alkoxy, aryloxy, siloxy or siloxane groups, with one or more kinds of a titanium or vanadium compound having at least one halogen atom, and subsequently reacting the thus obtained hydrocarbon-insoluble reaction product (A) with a specified organoaluminum compound (B).

3 Claims, No Drawings

HYDROCARBON-SOLUBLE ORGANOALUMINUM-MAGNESIUM COMPLEX

This is a division of application of U.S. Ser. No. 579,639, filed May 5, 1975 now U.S. Pat. No. 4,027,089, issued May 31, 1977.

DESCRIPTION OF THE INVENTION

This invention relates to processes for polymerization of ethylene and for copolymerization of ethylene and another olefin. More particularly, it relates to a novel process for low-pressure polymerization of ethylene by means of a unique catalyst derived from an organoaluminum-magnesium complex.

In connection with the process for low-pressure polymerization of ethylene in the presence of a catalyst consisting of a compound of transition metals belonging to Groups IV–VIA of the Periodic Table and an organometallic compound of metals belonging to Groups I–III of the Periodic Table, there have been developed and proposed numerous catalysts since the discovery of Ziegler's catalyst. Most of these are, however, so deficient in catalytic activity that a step is necessary for removing the catalyst from the polymer and this results in higher catalyst cost.

In recent years, extensive developments for highly active catalysts have been made with the view of omitting the catalyst removal step, simplifying the manufacturing process and reducing the catalyst cost.

The catalyst system known as high-activity catalyst is roughly classified into two groups. That is, the so-called supported catalyst resulting from the synthesis of the Ziegler catalyst on a certain solid surface; and a catalyst system prepared by combining a solid component made by reducing a titanium or vanadium compound with a specific organometallic compound, and a specific organometallic activator. It is known that many of the supported catalysts can provide much higher activity employing as support a halide, hydroxyhalide, alkoxide or organic acid salt or magnesium (for example, Japanese Patent Publication Nos. 13050-1968, 42039-1972 and 42137-1972 and Japanese laid open Patent Application No. 5941-1972). As the catalyst system derived from a specific organometal and a transition metal, these are known: a catalyst prepared from a solid component prepared by reacting a Grignard reagent or a compound of RMgOR$^1$ made in an inert medium and a transition metal compound (for example, West German laid open Application No. 2024558 and British Pat. No. 1299862); a catalyst made from a solid compound prepared by reacting a specific organo-aluminum compound with a titanium compound (Japanese Patent Publication No. 26380-1972); and a catalyst prepared from a solid compound containing titanium-and vanadium (for example, Japanese Patent Publication Nos. 28708-1972 and 28709-1972). Each of these catalysts is provided with a satisfactory activity per transition metal component but it cannot be said to be provided with a sufficiently high activity per solid component. Accordingly, in case the catalyst removal step is wholly omitted there will remain unsolved difficulties such as deterioration of the polymer due to halogen remaining in the polymer and corrosion of the manufacturing equipment.

We continued intensive studies of catalysts having a high activity per solid component and have found that an appreciably highly active catalyst is obtainable by combining a specific solid component made from a specific organoaluminum-magnesium complex and a titanium or vanadium compound, and an organoaluminum compound.

This invention resides in a process for polymerizing ethylene or a mixture of ethylene and another olefin which comprises polymerizing ethylene or a mixture of ethylene and another olefin in the presence of a catalyst prepared by: reacting a hydrocarbon-soluble organoaluminum-magnesium complex (i) represented by the general formula

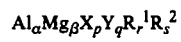

(wherein $R^1$ and $R^2$ each is a hydrogen atom or a hydrocarbon radical having 1–10 carbon atoms; X and Y are the same or different radicals $OR^3$ or $OSiR^4R^5R^6$ wherein $R^3$ is a hydrocarbon radical having 1–10 carbon atoms; $R^4$, $R^5$ and $R^6$ are each hydrogen atom or a hydrocarbon radical having 1–12 carbon atoms; $\alpha$ and $\beta$ are each a number more than zero, but has relations of $p + q + r + s = 3\alpha + 2\beta$ and $0 < (p + q)/(\alpha + \beta) \leq 0.80$), or a reaction product of a complex having the general formula of $Al_\alpha Mg_\beta R_r{}^1 R_s{}^2$ which corresponds to $p + q = 0$ in the general formula (i), with a linear or cyclic siloxane compound (ii) having a constitutional unit

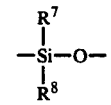

(wherein $R^7$ and $R^8$ are each hydrogen atom or a hydrocarbon radical having 1–10 carbon atoms) and one or more kinds of a titanium or vanadium compound (iii) having at least one halogen atom, and subsequently reacting the thus obtained hydrocarbon-insoluble reaction product (A) with an organoaluminum compound (B) represented by the general formula $AlR_m{}^9 Z_{3-m}$ (wherein $R^9$ is a hydrocarbon radical having 1–20 carbon atoms; Z is selected from the group consisting of hydrogen atom, halogen atom, alkoxy, aryloxy and siloxy groups; and m is a number in the range of 2–3).

According to this invention, it is possible to attain as great an activity as 30,000 g or more of polymer per solid component of catalyst, whereas, according to the patents concerning high-activity catalysts that have already been disclosed (for example, the Japanese Patents identified hereinabove), the activity obtained is below 10,000. A catalyst made from an organomagnesium compound and a transition metal compound has already been disclosed (Japanese Patent Publication No. 1546/1957). Since organomagnesium compounds are, however, insoluble in inert hydrocarbon solvents, there have not been achieved effective use of all the catalyst nor higher performance of activity. To overcome these difficulties, attempts were made to use an organomagnesium compound in a specified form (West German laid open patent specification No. 2024558, Dutch Pat. No. 7103232 and British Pat. No. 1299862). We also have found that a new catalyst is obtainable by incorporating a solid reaction product which is synthesized from a hydrocarbon-soluble organoaluminum-magnesium complex represented by the general formula $Al_n Mg_m R_{3n} R_{2m}{}^1$ wherein R and $R^1$ are hydrogen atom or hydrocarbon radicals, n and m are numbers of each greater than zero and a titanium or vanadium compound, with a hydrocarbon-soluble organoaluminum compound and were granted Pat. No. 4,004,071. The catalyst of our previous patent has a much higher activity than those of the prior art cited above. As a result of extensive studies, we have also found to our surprise that an organoaluminum-magnesium complex having an alkoxy, aryloxy, siloxy or siloxane group is soluble in hydrocarbon solvents. Then, we have achieved a superactive catalyst derived from this peculiar complex. When alkoxy or aryloxy group is introduced, in the molar range according to this invention, into a dialkyl-magnesium compound generally represented by $R_2Mg$, there is formed a hydrocarbon-insoluble compound. It is assumed, therefore, that such solubility results from a great change in its nature due to an organoaluminum-magnesium complex formed.

If said unique aluminum-magnesium complex containing an alkoxy, aryloxy, siloxy or siloxane group is used to form a solid reaction product with a titanium or vanadium compound which is then combined with an organoaluminum compound to make the specified catalyst for polymerization of ethylene, the activity is increased with the increase of the content of alkoxy, aryloxy, siloxy or siloxane groups and decreased after passing a maximum value. It becomes easier to control molecular weight and the resultant polymer is narrower in molecular weight distribution and excellent in structural regularity. The superiority of this catalyst will be described by way of Example 1 and Comparative Example 1. MI appearing therein denotes melt index and was measured at 190° C. and at 2.16 kg load in accordance with ASTM, D-1238. R represents a quotient obtained by dividing by MI the value determined at 21.6 kg load under the condition for measurement of MI and is a measure of moelcular weight distribution; the lower the value, the narrower the molecular weight distribution. As is apparent from the comparison between Example 1 and Comparative Example 1, the catalyst according to the present invention also surpasses our prior catalysts. That is, it provides polymers having higher MI, i.e. lower molecular weight, although its activity is a little lower. Therefore, in manufacturing polymers of the same molecular weight under a specified polymerization pressure, it is possible to reduce the amount of hydrogen used and raise the partial pressure of ethylene in a relative manner and thus to increase the polymerization activity. The polymer is so narrow in molecular weight distribution that a sufficiently high strength can be obtained even in a region of low molecular weight. This makes the polymer suitable for the production of large articles by the injection molding method.

Further description will be made of organoaluminum-magnesium complex is represented by the general formula $Al_\alpha Mg_\beta X_p Y_q R_r^1 R_s^2$ wherein $R^1$, $R^2$, X and Y; $\alpha$ and $\beta$; p, q, r and s have all the same meaning and/or relationship as above described.

The hydrocarbon radical represented by $R^1$ in the above-mentioned formula, having 1 to 10 carbon atoms, is alkyl, for example, methyl, ethyl, propyl, butyl, amyl, hexyl, octyl, decyl or the like and the hydrocarbon radical represented by $R^2$, having 1 to 10 carbon atoms, is alkyl or aryl, for example, methyl, ethyl, propyl, butyl, amyl, hexyl, octyl or phenyl as suitable radicals. As for the radicals $OR^3$ and $OSiR^4R^5R^6$ represented by X and Y, the hydrocarbon radical $R^3$ having 1-10 carbon atoms is an alkyl, a cycloalkyl or an aryl radical and those are preferable in which $R^3$ is, for example, methyl, ethyl, propyl, butyl, amyl, hexyl, octyl, decyl, cyclohexyl or phenyl, $R^4$, $R^5$ and $R^6$ are hydrogen atom or same or different hydrocarbon radicals having 1-10 carbon atoms and as such hydrocarbons, for example, an alkyl radical such as methyl, ethyl, propyl, butyl, hexyl or octyl, a cycloalkyl radical such as cyclohexyl, methylcyclohexyl or the like, or an aryl radical such as phenyl, naphthyl or the like. Illustrative siloxy radicals include, for example, methyldihydrosiloxy, dimethylhydrosiloxy, trimethylsiloxy, methylethylhydrosiloxy, methyldiethylsiloxy, triethylsiloxy, methylbutylhydrosiloxy, dimethylbutylsiloxy, methylphenylhydrosiloxy, ethylphenylhydrosiloxy, methylethylphenylsiloxy, triphenylsiloxy, α-naphthylphenylmethylsiloxy. The ratio of magnesium to aluminum $\beta/\alpha$ is particularly important in preparing the active solid component of the present invention. In order to synthesize a solid component having active structure, it is important that the complex used in the synthesis takes part in the reaction effectively under the reaction condition. For that purpose, the presence of the aluminum component suitable to stabilize the solution state is important. Too high a value of $\beta/\alpha$ and too lower a value reduce solubility. If $\beta/\alpha$ is low, the participation of the aluminum component becomes larger, resulting in reduction of activity. As is evident from Examples 10–13 and Comparative Example 3 hereinafter described, a preferred range is 1–10 and a further preferable range is 2–6. The content of X and Y radical, $(p + q)/(\alpha + \beta)$ is also important in attaining the effectiveness of the present invention. As is evident from Examples 2–4 and Comparative Example 2 hereinafter described, in the region of higher value of $(p + q)/(\alpha + \beta)$, activity is reduced. Accordingly, a preferred range is $(p + q)/(\alpha + \beta) \leq 0.8$. In order to obtain a polymer having a narrow molecular weight distribution, $(p + q)/(\alpha + \beta)$ is preferably in the range of 0.60–0.80. The siloxy-radical-containing complex is preferable because even if its content is increased, reduction of activity is low compared with the complex containing alkoxy or aryloxy radical. The said complex can be made by: reacting an organo-aluminum compound represented by the general formula $AlR_3$ (R is a hydrocarbon radical) and an organo-magnesium compound represented by the general formula $MgR_2^2$ or $R^2MgQ$ ($R^2$ is a hydrocarbon radical and Q is a halogen), and subsequently reacting the resultant hydrocarbon-soluble complex [Deutsches Patentamt Auslegeschrift 2232685 and Annalen des Chemie 605, 63 (1957)] and oxygen or an alcohol, silanol, aldehyde, ketone or ester of carboxylic acid under moderate conditions; reacting an organomagnesium compound represented by $R_2^1Mg$ and an alkoxy, aryloxy or siloxy aluminum or reacting alkoxy, aryloxy or siloxy magnesium represented by $R^2Mg(X)$ and $AlR_3^1$.

Description will be given of the siloxane compounds having the general formula of

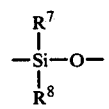

The substituents $R^7$ and $R^8$ are hydrogen atom or same or different hydrocarbon radicals having 1–10 carbon atoms. Among hydrocarbon radicals, methyl, ethyl, propyl, butyl, hexyl, octyl, cyclohexyl, phenyl or the like is recommendable. These compounds can be used in the form of linear or cyclic dimeric or polymeric (greater than dimeric) compounds consisting of one or more kinds of the constitutional unit. Illustrative compounds include symmetric dihydrotetramethyldisiloxane, hexamethyldisiloxane, pentamethyltrihydrotrisiloxane, cyclic methylhydrotetrasiloxane, polymethylhydrosiloxane (terminally blocked with methyl groups), polydimethylsiloxane, polyphenylhydrosiloxane (terminally blocked with methyl group), polymethylphenylsiloxane or the like.

The reaction of organoaluminum-magnesium complex and siloxane is carried out in an inert reaction medium (e.g. hexane, heptane, benzene or toluene) at a temperature of $-20°-150°$ C. with a reaction ratio of $(Si - O)/(Mg + Al)$ in the range of 0.3–5, preferably 0.5–2. In this reaction, the forming of the bond of Si — O — M and the coordination bond of

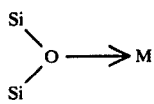

(wherein M is Al or Mg) is confirmed by infrared spectrum analysis and nuclear magnetic resonance spectrum analysis. It is preferable that the ratio of $(Si - O - M)/(Al + Mg)$ in the complex is 0.8 or less, from the standpoint of activity. The above-mentioned complex bond is preferable because it does not influence the activity, narrows the molecular weight distribution and at the same time lowers the chlorine content of the solid component [A].

The structure of the complex is not evident, but, as stated above, it is assumed that there results one or more complexes consisting of aluminum and magnesium components. This assumption is based on the fact that the reaction product made from $R^2Mg$ and oxygen or alcohol is insoluble in inert hydrocarbon solvents whereas said complex is soluble in those media. It is also presumed that there occurs an exchange reaction between a hydrocarbon radical and an alkoxy or an aryloxy which is connected with aluminum and magnesium.

The titanium or vanadium compound having at least one halogen atom [catalyst component (iii)] includes titanium tetrachloride, titanium tetrabromide, titanium tetraiodide, ethoxytitanium trichloride, propoxytitanium trichloride, butoxytitanium trichloride, dibutoxytitanium dichloride, tributoxytitanium monochloride, vanadium tetrachloride, vanadyl trichloride, monobutoxyvanadyl chloride, dibutoxyvanadyl monochloride; titanium and vanadium halides; hydroxyhalides; alkoxyhalides; and combinations thereof; particularly those compounds containing three or more halogen atoms, are preferable.

The reaction process between the organoaluminium-magnesium complex and the titanium or vanadium compound is extremely important for attaining the effectiveness of the present invention and the reaction is effected at a temperature up to 100° C., preferably below 20° C. in an inert reaction medium, e.g. aliphatic hydrocarbon such as hexane or heptane; aromatic hydrocarbon such as benzene, toluene or xylene; or alicyclic hydrogen such as cyclohexane or methylcyclohexane. In order to achieve high activity it is recommended that the reaction ratio of the two catalyst components is 0.05–50 mols; especially 0.2–5 mols of the organoaluminium-magnesium complex per mol of the titanium or vanadium compound. The number of mols for said organoaluminium-magnesium complex means the molar sum of aluminum and magnesium components. Taking as an example $AlMg_4 (OnC_4H_9)_{2.5} (C_2H_5)_{2.5} (n-C_4H_9)_6$, 722.3 grams corresponding to the molecular weight of the above structural formula is equivalent to 5 mols. In order to attain high catalyst activity, the simultaneous addition process in which two kinds of catalyst components are introduced simultaneously into the reaction zone is especially suitable. The hydrocarbon-insoluble reaction product may be directly used, provided the reaction is complete. It is desirable, however, to isolate it from the reaction mixture to enhance the reproducibility of polymerization.

Further, by simultaneously reacting the reaction product thus obtained, with a halide of aluminium, silicon, tin, titanium or vanadium, a catalyst enabling production of a polymer having a more uniform particle size and high bulk density can be synthesized.

As the organoaluminium compound (catalyst component B) according to this invention, there is used a compound or combined ones, denoted by the general formula $AlR_m^9Z_{3-m}$. Hydrocarbon radical $R^9$ containing 1–20 carbon atoms is an aliphatic, aromatic or alicyclic hydrocarbon. The radical denoted by Z is a hydrogen, halogen atom, alkoxy, aryloxy or siloxy radical and m is a number in the range 2–3. Recommended compounds include, for example, triethylaluminum, tri-n-propylaluminum, tri-isopropylaluminum, tri-n-butylaluminum, tri-isobutylaluminum, trihexylaluminum, trioctylaluminum, tridecylaluminum, tridodecylaluminum, trihexadecylaluminum, diethylaluminum hydride, di-isobutylaluminum hydride, diethylaluminum ethoxide, di-isobutylaluminum ethoxide, dioctylaluminum butoxide, di-isobutylaluminum octyloxide, diethylaluminum chloride, di-isobutylaluminum chloride, dimethylhydrosiloxyaluminum dimethyl, ethylmethylhydrosiloxyaluminum diethyl, ethyldimethylsiloxyaluminum diethyl, and combinations thereof.

Employing, in combination, the above alkylaluminum compound and the aforesaid hydrocarbon-insoluble solid results in a highly active catalyst. To obtain an extremely high catalytic activity, it is preferable to use especially a trialkylaluminum or dialkylaluminum hydride. When incorporating group Z, which is electronegative, in trialkylaluminum or dialkylaluminum hydride, the resultant polymer tends to decrease in activity but with the characteristic polymerization behavoir. Thus it is possible to make more useful polymers under high-activity conditions. As an example, introducing an alkoxy group affords easier control of molecular weight. The reaction between catalyst components (A) and (B) in accordance with the invention may be conducted by adding said both components to the polymerization system and under the polymerization condition, or otherwise in advance of polymerization. The reaction ratio of the components is preferably 1–3,000 m mols of component (B) per gram of component (A).

As the polymerization method there are available the usual suspension-, solution- and gas phase polymerizations. In cases of suspension or solution polymerization processes, the catalyst is let into the reactor with a polymerization medium, e.g. aliphatic hydrocarbon such as hexane or heptane; aromatic hydrocarbon such as benzene, toluene or xylene; or alicyclic hydrocarbon such as cyclohexane or methylcyclohexane. Then, ethylene is added up to 1–50 kg/cm² in an inert atmosphere and allowed to polymerize at room temperature to 150° C. On the other hand, in case of gas phase polymerization, it is possible to carry out the polymerization under the condition of 1–50 kg/cm² pressure of ethylene at a temperature from room temperature to 120° C. by using a procedure such as fluidized bed, moving bed or mixing with a stirrer in order to give better contact of ethylene with the catalyst. The catalyst can be added as it is, in the form of a solution or dispersion in hydrocarbon as mentioned above. In order to control the molecular weight of polymer, it is also possible to add hydrogen, a hydrocarbon halide or an organometallic compound which is liable to bring about chain transfer.

The catalyst according to this invention enables copolymerization with mono-olefins such as propylene, butene-1 or hexene-1, as well as polymerization of propylene with high efficiency.

The following examples illustrate but do not limit the invention. Symbols MI and R therein have the same meaning as above-mentioned. Catalyst efficiency is expressed as gram(s) of polymer per gram of solid component per hour per kg/cm$^2$ of ethylene pressure.

EXAMPLE 1

(1) Synthesis of the organoaluminum-magnesium complex

In a 500 ml flask, were placed 13.80 g of di-n-butylmagnesium and 2.85 g of triethylaluminum together with 200 ml of n-heptane. The mixture was reacted, with stirring, at 80° C. for 2 hours. Thus a complex having the composition corresponding to AlMg$_4$(C$_2$H$_5$)$_3$(n-C$_4$H$_9$)$_8$ was synthesized. This solution was cooled down to 10° C. and 50 ml of a solution of 50 m mols n-octanol in n-heptane was added, with cooling gradually, dropwise for one hour. Thus an organoaluminum-magnesium complex was synthesized. One portion of this solution was separated and oxidized by dry air, then hydrolyzed to convert the alkyl and alkoxy groups into their alcohols. The final product was analyzed by gas chromatography. From the analytical values based on ethanol, n-butanol and n-octanol, the composition proved to be AlMg$_4$(On-C$_8$H$_{17}$)$_{2.02}$(C$_2$H$_5$)$_{2.70}$(n-C$_4$H$_9$)$_{6.28}$.

(2) Synthesis of hydrocarbon-insoluble solid component

Oxygen and moisture inside a 500 ml flask equipped with 2 dropping funnels were removed by substituting with dry nitrogen, 160 ml of n-heptane was added thereto and cooled to −20° C. Then 80 ml of n-heptane solution containing 40 m mol of the above-mentioned complex and 80 ml of n-heptane solution containing 40 m mol of titanium tetrachloride were separately introduced in the dropping funnels. Both the components were simultaneously added with stirring at −20° C. for 2 hours and further reacted at this temperature for three hours. Resulting hydrocarbon-insoluble solid was isolated, washed with n-heptane and dried to give 10.8 g of the solid product.

(3) Polymerization reaction

In a 5 liter autoclave having been evacuated and nitrogen-substituted were placed 5 mg of the hydrocarbon-insoluble reaction product made in step (2) and 3.0 m mol of tri-isobutylaluminum plus 3 liter of n-heptane previously dehydrated and degassed. While the inner temperature of the autoclave was kept at 85° C., there was added hydrogen up to 3.0 kg/cm$^2$ gauge pressure followed by ethylene up to 10.0 kg/cm$^2$ total gauge pressure. With this condition the polymerization was performed for an hour. There was obtained 1.02 kg of polymer; MI, 2.76 and R, 31. The catalyst efficiency was 29,000.

COMPARATIVE EXAMPLE 1

The synthesis of catalyst and the polymerization were conducted just as in Example 1 except that organoaluminum-magnesium complex of the composition AlMg$_4$(C$_2$H$_5$)$_3$(n-C$_4$H$_9$)$_8$ made in Example 1 was used to prepare its hydrocarbon-insoluble reaction product. There was obtained 1.25 kg of polymer; MI, 0.85 and R, 46. The catalyst efficiency was 35,700.

EXAMPLE 2–4, COMPARATIVE EXAMPLE 2

A hydrocarbon-insoluble solid was synthesized similarily as in Example 1 except that organoaluminum-magnesium complexes indicated in Table 1 were used. Polymerization was carried out under the same conditions as these of Example 1 by using 5 mg of said solid and 3.0 m mol of triisobutylaluminum.

Table 1

| Examples | Organoaluminum-magnesium complex | Polymerization result | | | |
|---|---|---|---|---|---|
| | | Yield kg | Catalyst efficiency | MI | R |
| 2 | AlMg$_4$(OC$_8$H$_{17}$)$_{0.60}$(C$_2$H$_5$)$_{2.85}$(n-C$_4$H$_9$)$_{7.55}$ | 1.32 | 37,600 | 1.25 | 37 |
| 3 | AlMg$_4$(OC$_8$H$_{17}$)$_{1.50}$(C$_2$H$_5$)$_{2.75}$(n-C$_4$H$_9$)$_{6.75}$ | 0.935 | 26,700 | 2.95 | 29 |
| 4 | AlMg$_4$(OC$_8$H$_{17}$)$_{3.85}$(C$_2$H$_5$)$_{2.50}$(n-C$_4$H$_9$)$_{4.65}$ | 0.686 | 19,600 | 5.43 | 27 |
| Comparative Example 2 | AlMg$_4$(OC$_8$H$_{17}$)$_{5.05}$(C$_2$H$_5$)$_{1.95}$(n-C$_4$H$_9$)$_{4.00}$ | 0.189 | 5,200 | 7.20 | 26 |

EXAMPLE 5

In the same manner as in Example 1, organo-aluminium-magnesium complex of the composition AlMg$_6$(OiC$_4$H$_9$)$_{4.55}$(C$_2$H$_5$)$_{2.60}$(nC$_4$H$_9$)$_{7.85}$ was prepared by the use of triethylaluminum, di-n-butylmagnesium and isobutanol. Then, 40 m mol of titanium tetrachloride and 80 m mol of the above complex were reacted at 0° C. for 3 hours. Using 5 mg of the resultant hydrocarbon-insoluble solid and 6.0 m mol of trihexylaluminum, the polymerization was conducted as in Example 1. There was obtained 0.98 kg of polymer; MI, 3.50 and R, 30. The catalyst efficiency was 27,900.

EXAMPLE 6

In the same way as in Example 1, organo-aluminum-magnesium complex of the composition AlMg$_6$(OnC$_3$H$_7$)$_{2.10}$(C$_2$H$_5$)$_{2.75}$(n-C$_4$H$_9$)$_{10.15}$ was prepared by the use of triethylaluminum, di-n-butylmagnesium and n-propanol. Then 40 m mol of titanium tetrachloride and 32 m mol of this complex were reacted at 10° C. for 4 hours. Using 5 mg of the resultant hydrocarbon-insoluble solid and 6.0 m mol of trioctylaluminum, the polymerization was carried out as in Example 1. There was obtained 0.95 kg of polymer; MI, 1.65 and R, 35. The catalyst efficiency was 27,100.

EXAMPLE 7

In the same manner as in Example 1, organo-aluminum-magnesium complex of the composition AlMg$_2$(OnC$_6$H$_{13}$)$_{1.35}$(i-C$_4$H$_9$)$_{2.65}$(n-C$_4$H$_9$)$_{3.0}$ was prepared by the use of triisobutylaluminum, di-n-butylmagnesium and n-hexylalcohol. Then, 40 m mol of a 1:1 by mole mixture of titanium tetrachloride and monobutoxy-titanium trichloride and 40 m mol of the above complex were reacted at 0° C. for 4 hours. Using 5 mg of the resultant hydrocarbon-insoluble solid and 3.0 m mol of triisobutylaluminum, the polymerization was carried out as in Example 1. There was obtained 0.65 kg of polymer; MI, 3.60 and R, 32. The catalyst efficiency was 18,600.

EXAMPLE 8

In the same way as in Example 1, organo-aluminum-magnesium complex of the composition $AlMg_3(OC_2H_5)_{1.40}(nC_3H_7)_{2.70}(nC_6H_{13})_{4.90}$ was made by the use of tri-n-propylaluminum, di-n-hexylmagnesium and ethanol. Then, 40 m mol of vanadium tetrachloride and 40 m mol of this complex were reacted at $-10°$ C. for 3 hours. In a 5-liter autoclave having been evacuated to vacuum and nitrogen-substituted were placed 5 mg of the resultant hydrocarbon-insoluble solid and 3.0 m mol of tri-isobutylaluminum together with 3 liters of n-heptane previously dehydrated and degassed. While the inner temperature of the autoclave was kept at 85° C., there was added hydrogen up to 2.0 kg/cm$^2$ gauge pressure followed by ethylene up to 6.0 kg/cm$^2$ total gauge pressure. The polymerization was conducted for one hour while additional ethylene was added to maintain the total gauge pressure at 6.0 kg/cm$^2$. There was obtained 0.42 kg of polymer; MI, 1.89 and R, 34. The catalyst efficiency was 21,000.

EXAMPLE 9

In the same way as in Example 1, organo-aluminum-magnesium complex of the composition $AlMg_5(OnC_4H_9)_{3.0}(n-C_4H_9)_{10}$ was prepared by reacting 2.46 g of tri-n-butoxyaluminum and 6.90 g of di-n-butylmagnesium at 80° C. for 3 hours. Then, 40 m mol of this complex and 40 m mol of vanadyl trichloride were reacted at $-20°$ C. for 4 hours. Using as catalyst component 5 mg of the resultant hydrocarbon-insoluble solid and 3.0 m mol of tri-decylaluminum, the polymerization was performed as in Example 5. There was obtained 0.46 kg of polymer; MI, 2.15 and R, 33. The catalyst efficiency was 23,000.

EXAMPLES 10–14 AND COMPARATIVE EXAMPLE 3

A hydrocarbon-insoluble solid was obtained as in Example 1 by reacting the organoaluminum-magnesium complex indicated in Table 2 at $-30°$ C. for 4 hours. By using 5 mg of this solid and 3 m mol of trioctylaluminum, polymerization was carried out as in Example 8, whereby the result shown in the table was obtained.

$C_4H_9)_{2.50}(OC_2H_5)_{0.50}$, the polymerization was carried out as in Example 1. The polymer weighed 0.92 kg; MI, 5.20 and R, 30. The catalyst efficiency was 26,300.

EXAMPLE 16

Using 5 mg of the hydrocarbon-insoluble made in Example 1 and 6.0 m mol of organo-aluminum component of the composition $Al(i-C_4H_9)_{2.50}Cl_{0.50}$ the polymerization was carried out as in Example 1. The polymer weighed 0.84 kg; MI, 3.80 and R, 31. The catalyst efficiency was 24,000.

EXAMPLE 17

In the same way as in Example 9, organo-aluminum-magnesium complex of the composition $AlMg_2(OC_2H_5)_{1.0}(C_2H_5)_{2.0}(n-C_4H_9)_{4.0}$ was synthesized from diethylaluminum ethoxide and di-n-butylmagnesium. 40 m mol of titanium tetrachloride and 40 m mol of this complex were reacted at $-5°$ C. for 4 hours. The polymerization was carried out as in Example 1 except that 5 mg of the resultant hydrocarbon-insoluble solid and 3.0 m mols of tri-isobutylaluminum were used together with an ethylene-propylene mixture containing 3% of propylene instead of ethylene. The polymer weighed 1.26 kg; MI, 7.50 and R, 26. The catalyst efficiency was 36,000.

EXAMPLE 18

The polymerization was performed as in Example 17 except that an ethylene-butene-1 mixture gas containing 2% of butene-1 was used instead of an ethylene-propylene mixture gas. The polymer weighed 1.08 kg; MI, 9.75 and R, 27. The catalyst efficiency was 30,500.

EXAMPLE 19–26

A hydrocarbon-insoluble solid was synthesized as in Example 1 by reacting (A) organoaluminum-magnesium complexes which are shown in Table 3 and obtained by reacting dialkylmagnesium and siloxyaluminum compound as in Example 1, with (B) titanium tetrachloride with a mol ratio of A:B of 1:1. For the synthesis of the hydrocarbon-insoluble solid, in Examples 19–24, addition of the two components was carried out at $-10°$ C. for 2 hours and a further reaction was carried out at 5° c. for 2 hours, and in Examples 25–26, addition of the two compounds was carried out at $-20°$ C. for 2 hours and a further reaction was carried out at 10° C. for 2 hours. By using 5 mg of this solid and organoaluminum compound shown in Table 3, polymerization was carried out similarly as in Example 8 whereby results shown were obtained. The organoaluminum-magnesium complex in Example 26 was synthesized by the reaction of $AlMg_3(C_2H_5)_3(n-C_4H_9)_6$ and trimethylsilanol.

Table 2

| | | Polymerization result | | | |
| --- | --- | --- | --- | --- | --- |
| Examples | Organoaluminum-magnesium complex | Yield kg | Catalyst efficiency | MI | R |
| 10 | $AlMg_8(OnC_4H_9)_{4.53}(C_2H_5)_{2.65}(n-C_4H_9)_{11.82}$ | 0.374 | 18,700 | 3.13 | 28 |
| 11 | $AlMg_6(OnC_4H_9)_{3.46}(C_2H_5)_{2.72}(n-C_4H_9)_{8.82}$ | 0.530 | 26,500 | 3.52 | 28 |
| 12 | $AlMg_2(OnC_4H_9)_{1.52}(C_2H_5)_{2.80}(n-C_4H_9)_{2.68}$ | 0.450 | 22,500 | 2.87 | 29 |
| 13 | $AlMg(OnC_4H_9)_{1.05}(C_2H_5)_{2.75}(n-C_4H_9)_{1.20}$ | 0.352 | 17,600 | 4.05 | 32 |
| 14 | $AlMg_4(OnC_4H_9)_{2.05}(C_2H_5)_{2.02}(C_{10}H_{33})_{6.93}$ | 0.390 | 19,500 | 2.52 | 32 |
| Comparative example 3 | $Al_2Mg(OnC_4H_9)_{1.32}(C_2H_5)_{5.66}(n-C_4H_9)_{1.02}$ | 0.150 | 7,500 | 3.44 | 35 |

EXAMPLE 15

Using 5 mg of the hydrocarbon-insoluble solid component made in Example 1 and 6.0 m mol of organo-aluminum component of the composition Al(i-

Table 3

| Example | Organoaluminum-magnesium complex | Organoaluminum compound (amount used m mol) | | Polymerization result | | | Catalyst efficiency |
|---|---|---|---|---|---|---|---|
| | | | | Yield g | MI | R | |
| 19 | $AlMg_2(n-C_4H_9)_2(n-C_3H_7)_4[OSi(CH_3)_2n-C_4H_9]$ | $Al(i-C_4H_9)_3$ | (1.5) | 485 | 2.30 | 33 | 24,300 |
| 20 | $AlMg_6(C_2H_5)(n-C_4H_9)_{12}(OSi \cdot H \cdot CH_3 \cdot C_2H_5)_2$ | $Al(C_2H_5)_{2.5}(OC_2H_5)_{0.5}$ | (3.0) | 560 | 4.21 | 31 | 28,000 |
| 21 | $AlMg_3(C_2H_5)(n-C_4H_9)_6(OSi \cdot H \cdot CH_3 \cdot C_2H_5)_2$ | $Al(i-C_4H_9)_{2.5}Cl_{0.5}$ | (3.0) | 515 | 3.96 | 29 | 25,800 |
| 22 | $AlMg_2(C_2H_5)_2(n-C_5H_{11})_4(OSi \cdot H \cdot C_2H_5 \cdot C_6H_6)$ | $Al(n-C_6H_{13})_3$ | (3.0) | 460 | 3.06 | 34 | 23,000 |
| 23 | $AlMg_2(C_2H_5)_4(n-C_3H_7)_2(OSi \cdot H \cdot CH_3 n \cdot C_3H_7)$ | $Al(n-C_{12}H_{25})_3$ | (3.0) | 490 | 1.96 | 33 | 24,500 |
| 24 | $AlMg(i-C_4H_9)_2(n-C_6H_{13})_2(OSi \cdot H \cdot CH_3 \cdot n \cdot C_4H_9)$ | $Al(n-C_8H_{17})_3$ | (3.0) | 385 | 4.51 | 30 | 19,300 |
| 25 | $AlMg_3(C_2H_5)_{1.50}(n-C_4H_9)_{6.0}(OSi \cdot H \cdot CH_3 \cdot C_2H_5)_{1.50}$ | $Al(i-C_4H_9)_3$ | (1.5) | 530 | 3.25 | 32 | 26,500 |
| 26 | $AlMg_3(C_2H_5)_{1.65}(n-C_4H_9)_{4.20}[OSi(CH_3)_3]_{3.15}$ | $Al(i-C_4H_9)_{2.5}Cl_{0.5}$ | (3.0) | 464 | 5.28 | 28 | 23,200 |

EXAMPLES 27 to 31

Di-n-butylmagnesium and siloxyaluminum of the composition $Al(C_2H_5)(OSi.H.CH_3.C_2H_5)_2$ were reacted as in Example 1 to prepare its organo-aluminum-magnesium complex. This complex and the titanium or vanadium compound shown in Table 2 were reacted in the same way under the corresponding condition shown in the Table. Utilizing 5 mg of the resultant hydrocarbon-insoluble solid and the alkylaluminum compound shown, the polymerization was conducted under the same condition as in Example 1. The results are also given in that Table.

With regard to organoaluminum-magnesium complex, soloxane and reaction condition, those indicated in Table 5 are used.

The measurement of the bond of Si—O—M (wherein M is aluminum or magnesium) was carried out by concentrating the above-mentioned reaction product and determining the amount of gas generated at the time of decomposition with water.

(2) Synthesis of hydrocarbon-insoluble solid

By using the same method as that of Example 1 and under the conditions of Table 5, the synthesis of hydrocarbon-insoluble solid was carried out.

(3) Polymerization

Table 4

| | Hydrocarbon-insoluble solid | | | Organoaluminum compound (Amount used m mol) | | Polymerization result | | | |
|---|---|---|---|---|---|---|---|---|---|
| Example | Titanium, vanadium, compound | mol ratio Al + Mgl Ti or V | temp. x time (° C) (hr) | | | Yield g | ML | R | Catalyst efficiency |
| 27 | A 2:1 mixture of $TiCl_4$ and $TiCl_3$ $(OnC_4H_9)$ | 1/1 | $\phi \times 4$ | $Al(n-C_3H_7)_3$ | (1.5) | 345 | 5.20 | 28 | 17,300 |
| 28 | $VCl_4$ | 1/1 | $-20 \times 4$ | $Al(n-C_4H_9)_3$ | (1.5) | 585 | 2.21 | 36 | 29,300 |
| 29 | A 2:1 mixture of $TiCl_4$ and $VOCl_3$ | 1/1 | $-5 \times 4$ | $Al(i-C_3H_7)_3$ | (1.5) | 520 | 3.45 | 31 | 26,000 |
| 30 | $TiCl_4$ | 2/1 | $-30 \times 4$ | $Al(i-C_4H_9)_2H$ | (1.5) | 565 | 2.90 | 32 | 28,300 |
| 31 | $TiCl_4$ | 0.7/1 | $-10 \times 4$ | $Al(C_2H_5)_2H$ | (1.5) | 510 | 3.25 | 30 | 25,500 |

EXAMPLES 32–37

(1) Reaction of organoaluminum-magnesium complex and siloxane

Fifty ml heptane solution containing the organoaluminum magnesium complex, synthesized as in Example 1, in a concentration of 1.0 mol/l was reacted in a 200 ml flask with 50 ml heptane solution containing a siloxane compound in a concentration of 0.5–2.0 mol/l based upon Si—O.

Five mg of hydrocarbon-insoluble solid synthesized in (2), various aluminum components and dehydrated degassed hexane were introduced in a 1.5 l autoclave having been evacuated and then filled with nitrogen. While the inside temperature of the autoclave was maintained at 85° C. the pressure of hydrogen and ethylene were brought to the values indicated in Table 5 and the total pressure formed together with hexane vapor pressure was set to 4.7 kg/cm² gauge. Polymerization was carried out for one hour while holding the total pressure of 4.7 kg/cm² gauge by feeding ethylene, whereby the result shown in Table 5 was obtained.

Table 5

| | Caatalyst | | | | | | | | | |
|---|---|---|---|---|---|---|---|---|---|---|
| | Hydrocarbon-insoluble solid | | | | | | | | | |
| | Organoaluminum-magnesium complex siloxane reaction product | | | | | Ti or V compound | Ti/ Al + Mg (mol ratio) | Temp x time | Composi Composition 90 by weight | |
| Example | Organoalumin m magnesium complex | Siloxane | Si-O/ Al + Mg | temp. x time | Si-O-M /Al + Mg | | | | Ti | Cl |
| 32 | $AlMg_6(C_2H_5)_3$ $AlMg_6(C_2H_5)_3$ $(n-C_4H_9)_{12}$ | Syn. tetra-methyl-dihydro-disiloxane | 1.0 | Hr 0° C. × ½ | 0.17 | $TiCl_4$ | 1/1 | 5° C. × 4 | 13.2 | 37.5 |
| 33 | $AlM g_2(i-C_4H_9)_3$ $(n-C_4H_9)_4$ | Methylhydro-polysiloxane viscosity 30 Centistokes 30° C | 1.0 | ° C.Hr 100 × 5 | 0.78 | $TiCl_4$ | 1/1 | 5° C. × 4 | 12.5 | 38.9 |
| 34 | $AlMg_4(C_2H_5)_3$ $(n-C_3H_7)_8$ | methylpoly-siloxane viscosity 50 Centistokes 30° C Cyclic | 0.8 | ° C.Hr 100 × 10 Hr | 0.25 | $TiCl_4$ | 2/1 | 10° C. × 4 | 14.1 | 37.2 |

Table 5-continued

| | Catalyst Hydrocarbon-insoluble solid | | | | | | | | | |
|---|---|---|---|---|---|---|---|---|---|---|
| | Organoaluminum-magnesium complex siloxane reaction product | | | | | Ti or V compound | Ti/Al + Mg (mol ratio) | Temp x time | Composition 90 by weight | |
| Example | Organoalumin m magnesium complex | Siloxane | Si-O/Al + Mg | temp. x time | Si-O-M /Al + Mg | | | | Ti | Cl |
| 35 | AlMg$_6$(C$_2$H$_5$)$_3$ (n-C$_4$H$_9$)$_{12}$ | methyl-hydrotetra-siloxane | 1.0 | 80° C.×=5 Hr | 0.72 | TiCl$_4$ | 1/1 | 5° C.× 4 | 11.2 | 39.2 |
| 36 | " | " | " | " | 0.72 | VCl$_4$ | 1/1 | 0° C.× 4 | 12.5 | 43.1 |
| 37 | AlMg$_6$(C$_2$H$_5$)$_3$ (n-C$_4$H$_9$)$_{12}$ | Syn. tetra-methyl-dihydro-disiloxane | 1.0 | 0° C.× ½ | 0.17 | TiCl$_4$ | 1/1 | 5° C.× 4 | 13.2 | 37.5 |

| Catalyst Organoaluminum compounds (amount used m mol) | Polymerization pressure | | Polymerization result | | | |
|---|---|---|---|---|---|---|
| | Hydrogen kg/cm$^2$ | Ethylene kg/cm$^2$ | Yield g | Catalyst efficiency | MI | R |
| Al(i-C$_4$H$_9$)$_3$ (0.5) | 1.3 | 2.7 | 327 | 24,200 | 6.1 | 30 |
| Al(C$_8$H$_{17}$)$_3$ (2.0) | 1.0 | 3.0 | 325 | 21,700 | 4.5 | 27 |
| Al(n-C$_3$H$_7$)$_3$ (1.0) | 1.0 | 3.0 | 264 | 17,600 | 3.5 | 25 |
| Al(i-C$_4$H$_9$)$_3$ (0.5) | 1.3 | 2.7 | 286 | 21,200 | 6.8 | 27 |
| Al(C$_2$H$_5$)$_{2.5}$(OC$_2$H$_5$)$_{0.5}$ (2.0) | 1.3 | 2.7 | 259 | 19,200 | 7.2 | 26 |
| Al(i-C$_4$H$_9$)$_3$ (0.5) | 0.7 | 3.3 | 343 | 29,700 | 2.1 | 26 |

What we claim is:

1. A hydrocarbon-soluble organoaluminum-magnesium complex of the formula $$Al_\alpha Mg_\beta X_p Y_q R_r^1 R_s^2$$

wherein
$R^1$ is a hydrogen atom or an alkyl radical having 1 to 10 carbon atoms,
$R^2$ is a hydrogen atom, or an alkyl or aryl radical having 1 to 10 carbon atoms,
X and Y each independently is $OR^3$ or $OSiR^4R^5R^6$,
$R^3$ is an alkyl, cycloalkyl or aryl radical having 1 to 10 carbon atoms,
$R^4$, $R^5$ and $R^6$ each independently is a hydrogen atom or an alkyl, cycloalkyl or aryl radical having 1 to 12 carbons atoms,
$\alpha$ and $\beta$ each independently is a number more than zero and $\beta/\alpha$ is from 1 to 10,
$p + q + r + s = 3\alpha + 2\beta$, and
$0 < (p+q)/(\alpha+\beta) \leq 0.8$.

2. A hydrocarbon-soluble organoaluminum-magnesium complex of the formula $$Al_\alpha Mg_\beta R_r^1 R_s^2 (OR^3)_p$$

wherein
$R^1$ is an alkyl radical having 1 to 10 carbon atoms,
$R^2$ is an alkyl or aryl radical having 1 to 10 carbon atoms,
$R^3$ is an alkyl, cycloalkyl or aryl radical having 1 to 10 carbon atoms,
$\alpha$ and $\beta$ each independently is a number more than zero,
$\beta/\alpha$ is from 1 to 10,
$p+r+s=3\alpha+2\beta$, and
$0 < p/(\alpha+\beta) \leq 0.80$.

3. A hydrocarbon-soluble organoaluminum-magnesium complex of the formula $$Al_{60} Mg_{62} R_r^1 R_s^2 (OSiR^4R^5R^6)_p$$

wherein
$R^1$ is an alkyl radical having 1 to 10 carbon atoms,
$R^2$ is an alkyl or aryl radical having 1 to 10 carbon atoms,
$R^4$, $R^5$ and $R^6$ each independently is a hydrogen atom or an alkyl, cycloalkyl or aryl radical having 1 to 12 carbon atoms,
$\alpha$ and $\beta$ each independently is a number more than zero,
$\beta/\alpha$ is from 1 to 10,
$p+r+s=3\alpha+2\beta$, and
$0 < p/(\alpha+\beta) \leq 0.80$.

* * * * *

UNITED STATES PATENT AND TRADEMARK OFFICE
CERTIFICATE OF CORRECTION

PATENT NO. : 4,146,549
DATED : March 27, 1979
INVENTOR(S) : Itsuho Aishima et al It is certified that error appears in the above-identified patent and that said Letters Patent are hereby corrected as shown below:

Title Page  Related U.S. Applic. Data  delete "4,037,089" and insert -- 4,027,089--.

column 14, claim 3, line 3  delete "$Al_{60}Mg_{62}$" and insert --$Al_\alpha Mg_\beta$--.

Signed and Sealed this

Twenth-eighth Day of September 1982

[SEAL]

Attest:

GERALD J. MOSSINGHOFF

Attesting Officer

Commissioner of Patents and Trademarks